United States Patent
Haartsen

(10) Patent No.: US 7,245,649 B2
(45) Date of Patent: Jul. 17, 2007

(54) METHODS AND APPARATUS FOR ADAPTING A HOP SEQUENCE WHEN ESTABLISHING A COMMUNICATION CONNECTION

(75) Inventor: Jacobus Haartsen, Hardenburg (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 769 days.

(21) Appl. No.: 10/191,766

(22) Filed: Jul. 9, 2002

(65) Prior Publication Data

US 2004/0008756 A1    Jan. 15, 2004

(51) Int. Cl.
*H04B 1/00* (2006.01)
(52) U.S. Cl. .................. 375/132; 375/131; 375/133; 375/136; 375/346; 455/464
(58) Field of Classification Search .............. 375/132, 375/130, 131, 136, 346, 133; 455/464
See application file for complete search history.

(56) References Cited

U.S. PATENT DOCUMENTS

| | | | | |
|---|---|---|---|---|
| 4,716,573 A | * | 12/1987 | Bergstrom et al. | 375/132 |
| 5,323,447 A | | 6/1994 | Gillis et al. | 379/61 |
| 5,937,002 A | * | 8/1999 | Andersson et al. | 375/131 |
| 5,940,431 A | * | 8/1999 | Haartsen et al. | 375/131 |
| 6,108,366 A | | 8/2000 | Haartsen | 375/134 |
| 6,298,081 B1 | * | 10/2001 | Almgren et al. | 375/132 |
| 6,389,057 B1 | | 5/2002 | Haartsen | 375/132 |
| 6,480,721 B1 | * | 11/2002 | Sydon et al. | 455/464 |
| 6,643,278 B1 | * | 11/2003 | Panasik et al. | 370/330 |
| 6,909,737 B1 | * | 6/2005 | Kockmann et al. | 375/133 |

FOREIGN PATENT DOCUMENTS

| | | |
|---|---|---|
| EP | WO 01/29984 | 4/2001 |
| WO | WO 00/62438 | 10/2000 |

OTHER PUBLICATIONS

EPO Standard Search Report; File No.: RS 109383; Mar. 28, 2003.
Jaap C. Haartsen; Entitled: *The Bluetooth Radio System*; IEEE Personal Communications; Feb. 2000; pp. 6-14.

* cited by examiner

*Primary Examiner*—Dac Ha
*Assistant Examiner*—Ted M. Wang
(74) *Attorney, Agent, or Firm*—Michael Cameron, Esq.

(57) ABSTRACT

Methods and apparatus are provided for establishing a connection between a scanner device and a pager device over a sequence of hop channels. The scanner device is repetitively activated and a hop channel is selected from the sequence of hop channels as a function of a present phase. A determination is made as to whether the selected hop channel is a forbidden hop channel. A substitute hop channel is selected from the sequence of hop channels as the selected hop channel if the selected hop channel is a forbidden hop channel. The selected hop channel is monitored for receipt of a paging message during the present phase.

20 Claims, 6 Drawing Sheets

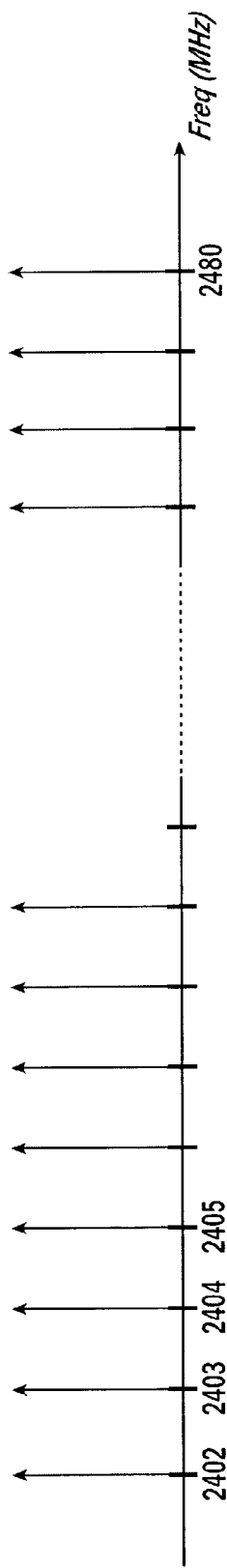

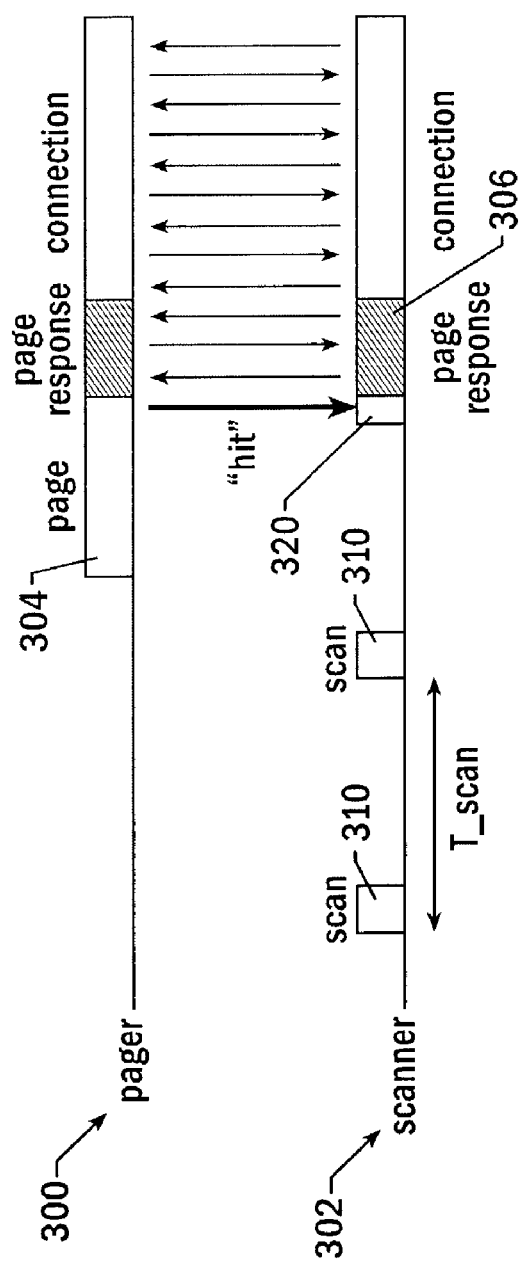

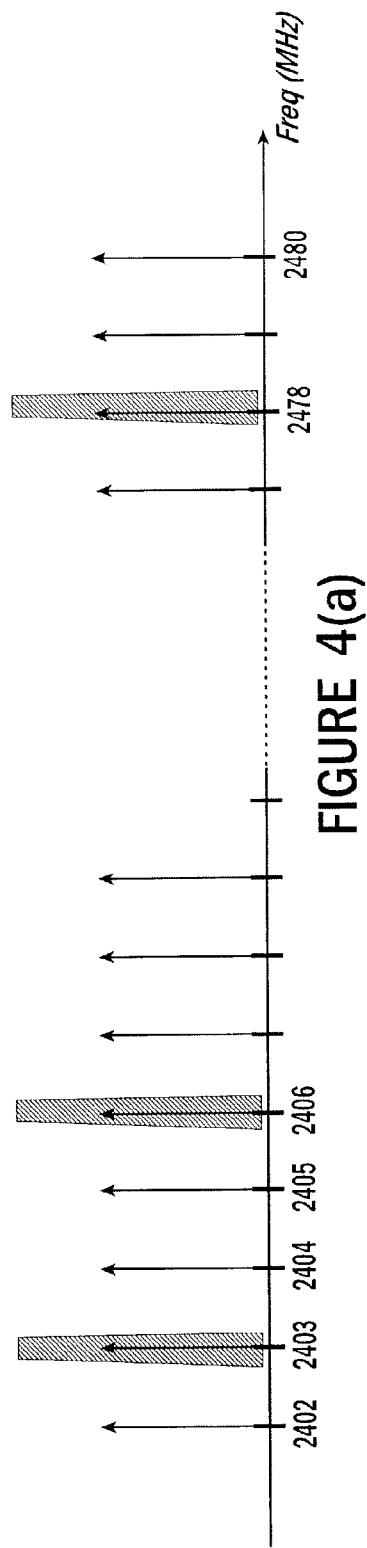
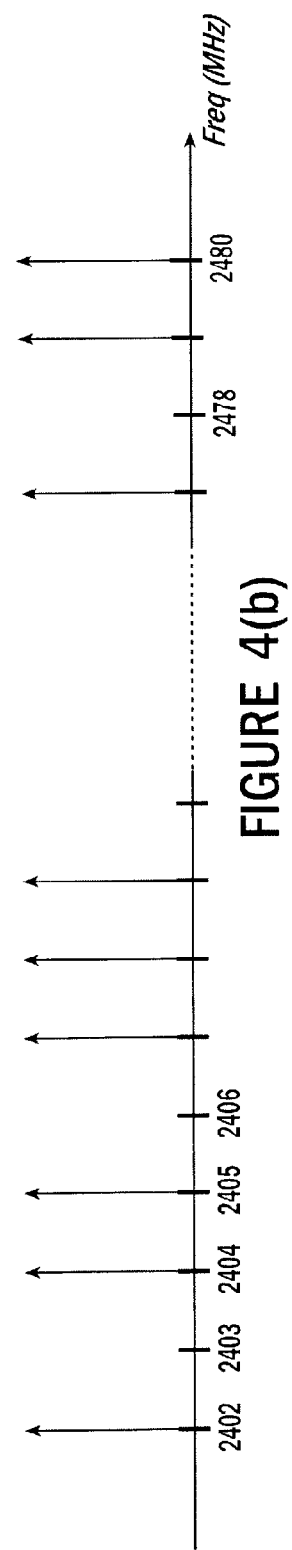
FIGURE 4(a)
FIGURE 4(b)

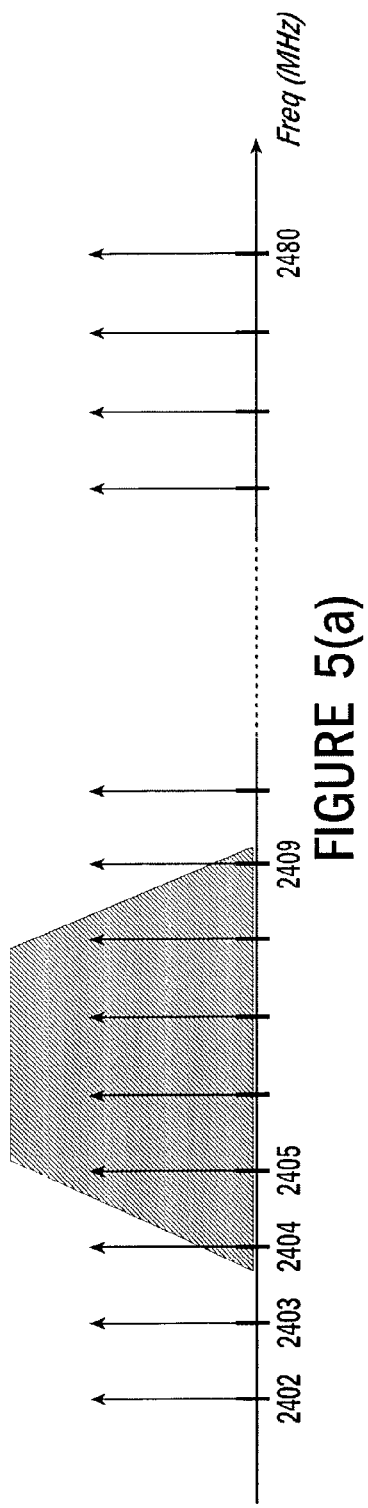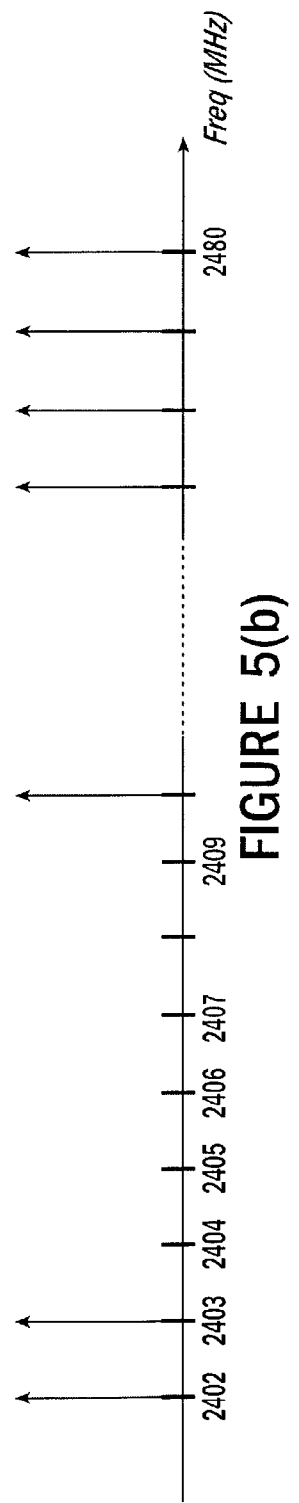

| k_mod_8 | CHANNEL | status |
|---|---|---|
| 0 | G(0) | allowed |
| 1 | G(1) | allowed |
| 2 | G(2) | forbidden |
| 3 | G(3) | forbidden |
| 4 | G(4) | allowed |
| 5 | G(5) | allowed |
| 6 | G(6) | allowed |
| 7 | G(7) | allowed |

METHODS AND APPARATUS FOR ADAPTING A HOP SEQUENCE WHEN ESTABLISHING A COMMUNICATION CONNECTION

FIELD OF THE INVENTION

The present invention relates to communication systems in which transmitters and receivers hop frequencies while communicating. More particularly, the present invention relates to adapting hop sequences in a frequency hopping communication system.

BACKGROUND

In the last decades, progress in radio and VLSI technology has fostered widespread use of wireless communication in consumer applications. Both the quantity and variety of types of wireless communication devices has been fostered by the availability of unlicensed communication bands, such as the ISM (Industrial, Scientific and Medical) radio band at 2.45 GHz, which may be available almost globally. The ISM band provides 83.5 MHz of radio spectrum.

The widespread use of wireless communication devices, especially concentrated in the ISM band, may sometimes lead to interfering radio signals between groups of communicating devices or with other radio transmission devices. One way to reduce the affect of interfering radio signals is to spread communication signals across a radio band. The FCC in the United States currently requires radio equipment operating in the 2.45 GHz band to apply some form of signal spreading when the transmit power exceeds about 0 dBm. Known forms of signal spreading include symbol level spreading, such as applying direct-sequence (DS) spread spectrum, and channel level spreading, such as frequency hopping (FH) spread spectrum.

In frequency hopping systems, spreading is provided by transmitting the information data stream over radio frequencies that vary in a predetermined manner for each transmission. One such industry standard system is known as Bluetooth, which was introduced to provide device connectivity, especially among portable devices, like mobile phones, laptops, personal digital assistants (PDAs), and other mobile devices. The Bluetooth devices use frequency hopping and may support both data and voice communications. More particularly, Bluetooth devices that support voice transmissions may use both frequency hopping and robust voice coding. One example of such frequency hopping includes a nominal hopping rate of 800 hops/second through the 2.45 GHz ISM radio band.

Devices based on the Bluetooth system concept can create so called piconets, which comprise a master device and one or more slave devices that communicate via FH piconet channels. Devices communicating on a FH piconet may hop between channels according to a hop sequence that may be defined by the address or identity of the device acting as the master. While communicating, devices may remain synchronized by hopping among the same channel sequence and at the same phase, or location, within the sequence.

The phase of the communicating devices may be synchronized with a shared clock reference. Bluetooth devices may each have their own free-running system clock which may be synchronized when a communication link is established. For example, a slave device may add a time offset to its clock such that it becomes aligned with the clock of the master device. By using the master address to select the proper hopping sequence and by using the time offset to align to the master clock, the slave device may keep in hop synchrony to the master device. Such communication is further described in commonly owned U.S. patent application Ser. No. 08/932,911, filed Sep. 18, 1997 in the name of J. C. Haartsen and entitled "Frequency Hopping Piconets in an Uncoordinated Wireless Multi-User System," which is hereby incorporated herein by reference in its entirety. Further reference is made to the commonly owned U.S. Pat. No. 6,108,366 issued on Aug. 22, 2000, which is hereby incorporated herein by reference in its entirety. Further reference is made to commonly owned U.S. patent application Ser. No. 09/418,562, filed on Oct. 15, 1999 in the name of J. C. Haartsen and entitled "Method and apparatus for sequence adaptation," which is hereby incorporated herein by reference in its entirety.

Communication between two or more devices may be established by one device transmitting a paging message to another device. Upon receiving the paging message, the receiving device may transmit a response to the paging device so that the devices may form a synchronized FH communication link.

Establishing a FH communication link may be complicated or delayed when one of the communication devices to be paged is capable of switching between a scanning mode, in which it scans for a paging message, and a sleep mode, in which paging messages may not be received. Such receiving devices periodically awake from the sleep mode to scan for any paging messages from a paging device (i.e., master device). With many such communication devices, the paging devices may not know when and on what hop channel the paged device will listen for paging messages. Moreover, the presence of interference may prevent the paged device from receiving a paging message even when it is transmitted on the same hop channel on which the paged device is listening.

The operations for establishing a communication link between Bluetooth devices has been described in the commonly owned U.S. Pat. No. 5,940,431, issued on Aug. 17, 1999, and the commonly owned U.S. Pat. No. 6,389,057, issued on May 14, 2002, both of which are hereby incorporated herein by reference in their entirety.

SUMMARY OF THE INVENTION

According to embodiments of the present invention a method is provided for establishing a connection between a scanner device and a pager device over a sequence of hop channels. The scanner device is repetitively activated and a hop channel is selected from the sequence of hop channels as a function of a present phase. A determination is made as to whether the selected hop channel is a forbidden hop channel. A substitute hop channel is selected from the sequence of hop channels as the selected hop channel if the selected hop channel is a forbidden hop channel. The selected hop channel is monitored for receipt of a paging message during the present phase.

In other embodiments, interference on a selected channel may be monitored and a selected channel may be determined to be a forbidden hop channel when the interference exceeds a threshold value. In response to the interference determination the selected hop channel may be included in a set of forbidden hop channels or may be removed from the set. In other embodiments, a selected hop channel may be compared to a set of forbidden hop channels to determine whether it is allowable or forbidden.

In other embodiments, a substitute hop channel may be selected among a sequence of hop channels using a time-varying parameter such as a clock value, a randomly selected value, pseudo-randomly selected value, or a non-random value or a time-fixed relationship between a forbidden hop channel and a substitute hop channel may be used.

In this manner methods and apparatus may be provided that allow a scanner device to determine whether a hop channel is forbidden or allowable and to avoid monitoring forbidden hop channels for paging messages. Communication links with a paging device may be established more quickly.

BRIEF DESCRIPTION OF THE DRAWINGS

FIG. 2 depicts exemplary hop carriers in the ISM band.

FIG. 3 is a timing diagram for establishing a connection between two communication devices according to embodiments of the present invention.

FIGS. 4(a) and 4(b) depict exemplary hop carriers in the ISM band with narrowband interference and with interfered carriers removed, respectively.

FIGS. 5(a) and 5(b) depict exemplary hop carriers in the ISM band with wideband interference and with interfered carriers removed, respectively.

DETAILED DESCRIPTION OF INVENTION

The present invention will now be described more fully with reference to the accompanying drawings, in which typical embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

According to some embodiments of the present invention, apparatus and methods for adapting hop sequences during the establishment of a connection between frequency hopping communication devices may be provided. FIGS. 1-8 illustrate exemplary apparatus and operations according to various embodiments of the present invention. It will be understood that operations depicted in the figures, and combinations thereof, may be implemented using one or more electronic circuits, such as in one or more discrete electronic components, one or more integrated circuits (ICs) and/or one or more application specific integrated circuits (ASICs) and/or application specific circuit modules, as well as by computer program instructions, which may be executed by a computer or other data processing apparatus, such as a microprocessor or digital signal processor (DSP).

The computer program instructions may also be embodied in the form of a computer program product in a computer-readable storage medium, i.e., as computer-readable program code embodied in the medium for use by or in connection with an instruction execution system. The computer-readable storage medium may include, but is not limited to, electronic, magnetic, optical or other storage media, such as a magnetic or optical disk or an integrated circuit memory device. Accordingly, FIGS. 1-8 support electronic circuits and other apparatus that perform the specified operations, and acts for performing the specified operations.

The terms "comprises" or "comprising" when used in this specification are taken to specify the presence of stated features, elements, steps, or components but do not preclude the presence or addition of one or more other features, elements, steps, components or groups thereof.

Further, the term "communication device" as used herein may include, but is not limited to, a Bluetooth device, a wireless local area network (WLAN) device such as compliant with IEEE 802.11, a cellular terminal; a personal communication device that may combine wireless communication ability with data processing, facsimile, data communications capabilities and/or global positioning system (GPS) receiver; a personal digital assistant (PDA) that may include wireless communication ability; a pager; satellite communications equipment; and infrastructure equipment with wireless communication ability; or any devices that may communicate through other equipment that provides wireless communication ability.

Figure 1:
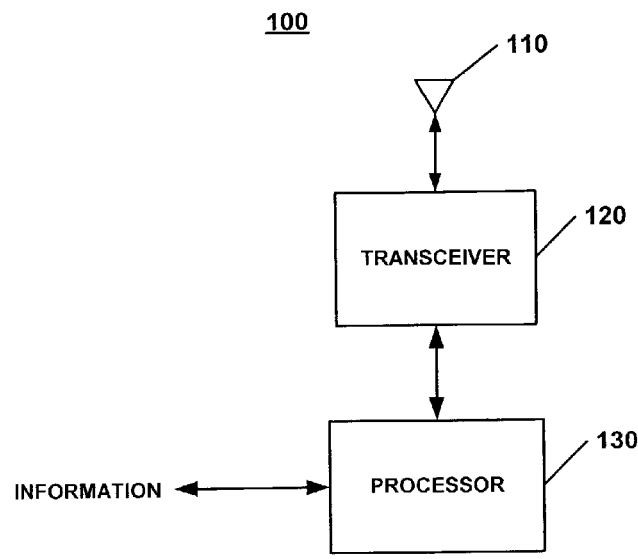
FIG. 1 is a block diagram of a frequency hoping communication device according to embodiments of the present invention.

A frequency-hopping (FH) communication device 100 according to embodiments of the present invention is shown in FIG. 1. The communication device 100 includes an antenna 110, a transceiver 120, and a processor 130. The processor 130 provides an information signal to the transceiver 120 for transmission. The transceiver 120 may code, modulate, and upconvert the information signal to a hop channel, and transmit the signal via the antenna 110 to another communication device. Likewise, the transceiver 120 may receive, downconvert, demodulate, and decode a signal received on a hop channel to provide information to the processor 130.

The communication device 100 may transmit and receive signals on sequences of time-varying hop channels within a band of hop channels. The sequence of channels among which communications hop may be selected in a random, pseudorandom, and/or sequential manner. For Bluetooth and IEEE 802.11 WLAN communication devices, a random or pseudo-random hop sequence may be required for compliance with the respective industry specifications.

The communication device 100 may use the unlicensed ISM band at 2.45 GHz, which is illustrated in FIG. 2. The ISM band can provide 83.5 MHz of spectrum which can be divided into 79 communication channels equally spaced by 1 MHz. The first and last hop channels can be provided at 2402 MHz and 2480 MHz, respectively, as shown in FIG. 2. As a so-called relaxed radio transmitter design choice, the communication device 100 might not use hop channels at the edges of the band to satisfy FCC requirements on out-of-band spurious transmissions. The 79 channels form a set of hop channels, which the communication device 100 may hop among while communicating with other communication devices.

Each such communication device may further include, for example in the processor 130, a set of hop sequences, a unique address for the communication device, and a clock. The address or other unique identifier may be used to select a hop sequence among the set of hop sequences and the clock may be used to determine the phase in the sequence, that is, which particular hop of the sequence is selected at a particular time. Two or more FH communication devices may form a synchronized communication link by selecting the same hop sequence and phase. Selection of the same hop sequence and phase may be provided by sharing an address code and clock indication (i.e., clock value), respectively, among the communicating communication devices.

The communication devices may switch between a sleep mode, in which the devices do not receive paging messages, and a scanning mode, in which the devices scan for paging messages. In the sleep mode, a portion of the communication device 100, such as the transceiver 120, may be powered-down or off to conserve power and no messages may be received or transmitted. Power may be further conserved by remaining predominately in the sleep mode. For example, such communication devices may cycle between the sleep mode and the scanning mode with a duty cycle ratio of a few percent (i.e., scanning-time/sleep-time). Such mode switching can complicate the initial synchronization of two or more FH communication devices. In particular, when a communication device is in the sleep mode for a particularly long time, the time delay associated with establishing a connection can become correspondingly long.

FIG. 3 illustrates conventional operations that may be performed by two or more communication devices to establish a FH communication link. The communication device that seeks to establish a communication link is referred to as the pager device 300 and the communication device that is being paged is referred to as the scanner device 302. Although one scanner device 302 is shown, communication links between a pager device and a plurality of scanner devices may be established in the manner described herein.

The scanner device 302 periodically wakes from a sleep mode and selects a hop channel within a hop sequence to scan 310 for a paging message containing the address of the scanner device 302. The hop sequence may, for example, contain 32 pseudo-random selected hop channels defined by the address of the scanner device 302. Each time the scanner device 302 switches to the scanning mode, it sequences using an index to the next hop channel in the sequence to listen for a paging message.

The time interval between such scans ("T_SCAN") may, for example, be 1.28 seconds, although the scans 310 can be performed at faster or slower rates. The time duration of each scan 310 to look for a paging message may be much shorter (for example, 11 ms) than the time interval between scans. When a 1.28s interval is provided between scans, the scanner device 302 may take 41 seconds to scan 32 hop channels (i.e., 32×1.28s).

The pager device 300 may determine the hop sequence from the address of the intended scanner device 302 but may not accurately know, or perhaps not have any knowledge of, the present phase of the scanner device 302 in the hop sequence. The pager device 300 consecutively transmits a page message within a paging window 304, containing the address or another unique identifier of the scanner device 302, on different hop channels selected from the hop sequence of the scanner device 302.

For Bluetooth devices, the page message within the window 304 may, for example, comprise a short binary bit sequence, such as a 68 bit length code. In a 10 ms period the pager device 300 may transmit the same page message on 16 different hop channels, which corresponds to half of the sequence of hop channels scanned by the scanner device 302. The half of the sequence of hop channels may be referred to as "Train A".

Recent FCC regulations for communication in the ISM band require the use of at least 15 channels in a hop sequence. However, when allowed by governmental regulations, smaller subsets of a hop sequence may be used.

The pager device 300 may transmit the page message on the 16 hop channels for the expected duration of the standby period of the scanner device 302 (T_SCAN) which may be 1.28 seconds. If the scanner device 302 switches from the sleep mode to the scanning mode in any of these 16 hop channels, such as shown by the scan 320, it may receive the page message, shown as a "HIT", and respond with a page response message within a response window 306 to the pager device 300. However, when the pager device 300 does not receive a page response message to its page messages transmitted in the Train A after a time corresponding to the standby time T_SCAN, the pager device 300 may begin transmitting the page message consecutively on the hop channels in the other 16 channel half of the 32 channel hop sequence (referred to as "Train B").

Upon receiving the page response message, the pager device 300 may abort the paging sequence and begin exchanging messages at a higher hop rate, such as 800 hops/s, with the scanner device 302. The pager device 300 and scanner device 302 may use timing of the page message to synchronize the phase and provide a synchronized FH communication link connection therebetween. Alternative or additionally, the pager device 300 and scanner device 302 may exchange other information, such as another hop sequence selection value and/or phase, to synchronize the communication link. Once a synchronized communication link is established, the pager device 300 may become a master device and the scanner device 302 may become a slave device. The master device may control communication exchanges with one or more connected slave devices.

When the pager device 300 can estimate the phase of the scanner device 302, it may establish a connection more quickly by selecting a portion of the sequence of hop channels used by the scanner device 302 (i.e., 16 of the 32 hop channels) which are about equally distributed ahead-of and behind the estimated phase. For example, assume a hop sequence represented by F(k) where k is a modulo-32 clock value. Assume also that the pager device 300 estimates the clock value of the scanner device 302 as k_est. The pager device 300 may transmit the page message on hop channels F(k_est−8), F(k_est−7), . . . , F(k_est−1), F(k_est), F(k_est+1), . . . , F(k_est+7). In this manner, the page message may be received by the scanner device 302 when the estimated phase is wrong by an offset between −8 and +7 in the sequence of hop channels. If no response is received from the 16 channel paging train, F(k_est−8) to F(k_est+7), the other train may be selected. In some embodiments of the present invention it may be advantageous for an A train and a B train to overlap with one common hop channel because the pager device 300 may change trains at the same phase rate as the scanner device 302 changes its scan frequency.

When the scanner device 302 is scanning hop channels for a paging message, interference on the hop channels from other devices may prevent reception of the paging message and cause delay in the establishment of a connection with the pager device 300. The number of wireless communication devices has been rapidly increasing and the increase has been particularly rapid in the unlicensed communication bands, such as the ISM band. Such devices include baby monitors, garage door openers, identification (ID) devices, and Wireless Local Area Network (WLAN) devices.

FIG. 4(a) illustrates a situation where narrowband interference is present on hop channels 2403, 2406, and 2478. FIG. 5(a) illustrates a situation where wideband interference is present across hop channels 2404 to 2409. If the occupied hop channels are in the sequence of channels scanned by the scanner device 302, a paging message may not be received and establishment of a connection may be delayed until at least the next scan. If the next scan also occurs on an occupied hop channel, the delay is cumulative and the overall delay may become unacceptably long.

According to some embodiments of the present invention, the scanner device 302 removes interfered/occupied/reserved channels from the scanned hop sequence and substitutes other hop channels in their place. For example, as shown in FIG. 4(*b*), channels 2403, 2406, and 2478 are removed. As shown in FIG. 5(*b*), channels 2404-2409 are removed from hop sequences.

In a conventional Bluetooth system, a communication device in a scanner mode may scan 32 hop channels covering about 64 MHz of bandwidth for page messages. According to some embodiments of the present invention, by monitoring interference levels on the 32 channels, the communication device may determine which channels are interfered/occupied and less likely to be capable of providing a paging message or being used to carry other messages relating to establishing a communication link with another communication device. The communication device may obtain a paging message more quickly by not waiting for page messages on interfered channels. For example, the communication device may designate 17 of the 32 channels as unusable or forbidden, and thereby, reduce the bandwidth scanned for paging messages from 64 MHz to 30 MHz.

Figures 6, 7:
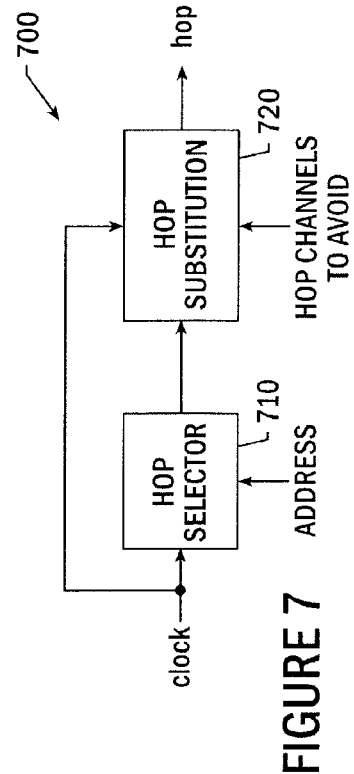
FIG. 6 is a table showing allowed and forbidden channels in a sequence of hop channels.
FIG. 7 is a block diagram of a hop selection circuit according to embodiments of the present invention.

In some embodiments of the present invention, the scanner device 302 can maintain a list of allowed channels and forbidden channels in a hop sequence used for scanning. An example list is shown in FIG. 6, in which the hop sequence spans from channel G(0) to G(7). Although a sequence of eight channels has been shown for illustration purposes any length hop sequence may be used. As shown, two of the hop channels, G(2) and G(3), are forbidden. The forbidden channels should be avoided while scanning for paging message for any of a number of reasons. For example, the forbidden channels may correspond to where a substantial amount of interference has been detected. It may also be the case that one or more hop channels are known to be "reserved" for use by another system, so that the scanner device 302 can avoid experiencing interference by avoiding those channels. Similarly, a nearby system may be required to provide a high priority/high quality service via one or more hop channels. In this case, a communication device may skip those channels to avoid causing interference and possibly disturbing the nearby system.

It will also be recognized that the designation of a hop channel as alternatively "forbidden" or "allowed" need not be static, but can instead be determined and changed dynamically. According to some embodiments of the present invention, the scanner device 302 may sense the amount of interference on individual hop channels in the hop sequence and, when the interference exceeds a threshold value, it may label the channel forbidden. The sensing may include measuring an indication of the received signal strength when a paging message is not being directed to the scanner device 302. Similarly, when the amount of interference is below a threshold value, the scanner device 302 may change a previously labeled forbidden channel to an allowed channel. Interference may be sensed periodically, such as with a scan process and/or independent from the scan process, or performed non-periodically.

According to some embodiments of the present invention, the scanner device 302 may measure the amount of interference on a hop channel, to determine whether it is allowable, while it is scanning for a paging message on the hop channel. The page message may comprise a binary sequence that is derived from the address of the scanner device 302. Upon receiving a page message, the scanner device 302 may compare (i.e., correlate) its address with the address represented by the page message. When a threshold number of bits match between the two addresses, the page message may be determined to be intended for the scanner device 302. In this manner, an exact match may not be necessary to make the determination. The closeness of the comparison may also indicate the amount of interference on the scanned hop channel. When the closeness of the comparison is outside a threshold range, such as when less than a lower threshold number of bits match, the scanned hop channel may be determined to have an unacceptable amount of interference and the scanned channel may be labeled a forbidden channel. Other channel interference detection (quality detection) techniques may be applied as will be apparent to those who are skilled in the art. For example, techniques based on soft information derived from, for example, maximum likelihood sequence estimation (MLSE) or forward-error-correction coding, may be used to determine the quality of a channel.

When a hop channel has been determined to be a forbidden channel, it is possible, and perhaps likely, that the adjacent channels contain an unacceptable amount of interference. Consequently, the scanner device 302 may designate as forbidden, the channel(s) that are adjacent to a hop channel that has been determined, or otherwise designated, a forbidden hop channel. The number of adjacent channels that are designated as forbidden may be determined, for example, by the number of allowable scanning channels, and a minimum number of scanning channels that may required (such as by governmental regulations) for the system and/or may be determined by any known, or detectable, correlation of the interference found on a forbidden channel and adjacent channels.

A list of forbidden channels may also be provided to the scanner device 302 from another communication device, synchronized with a list in another device, such as a pager device, or may be preloaded therein.

Hop selection may be provided by a hop selection circuit 700 as shown in FIG. 7 according to embodiments of the present invention. The hop selection circuit 700 includes a hop selector circuit 710 and a hop substitution circuit 720. The hop selector circuit 710 receives an address from which it selects a hop channel sequence from a set of hop channel sequences and receives a clock value from which a phase in the channel sequence is determined. In some embodiments, hop selection by the hop selector circuit 710 may be performed in a manner consistent with conventional FH communication devices, such as Bluetooth. The hop selector circuit 710 outputs a selected hop channel to the hop substitution circuit 720, where the selected hop channel is compared to a list of forbidden hop channels and, when the selected channel is forbidden a substitute channel is selected. As will be appreciated, the hop selection circuits 700 may be performed within the processor 130 and/or in other separate circuitry.

Figure 8:
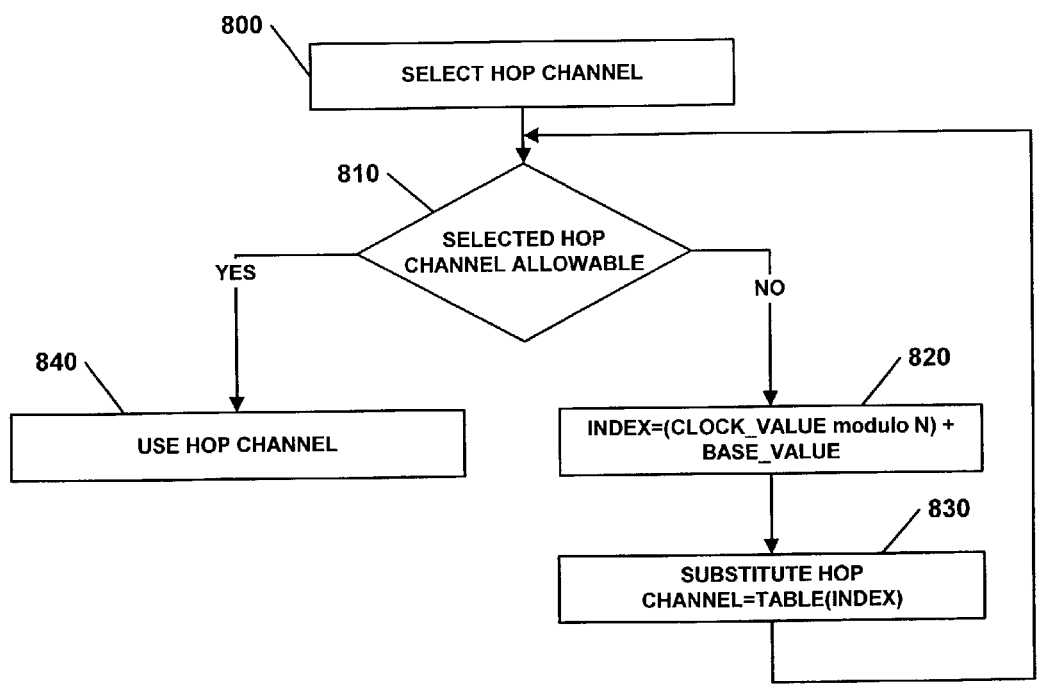
FIG. 8 is a flow chart of operations for selecting substitute channels according to embodiments of the present invention.

Example operations for selecting and substituting hop channels according to some embodiments of the present invention are shown in FIG. 8 and discussed with reference to the channel sequence table shown in FIG. 6. At Block 800 a hop channel is elected as a function of the hop sequence and phase within the sequence. For example, when the phase is 3, the selected hop channel is G(3). The selected hop channel is compared to the list of hop channels, FIG. 6, and a decision is made at Block 810 whether the selected hop channel is allowed or forbidden.

When allowed, the selected hop channel is used at Block 840 to scan for a paging message. When forbidden, such as determined for G(3), an index to a substitute hop channel is formed at Block 820. In some embodiments, the index may be provided by the following equation:

Index=(Clock_Value modulo $N$)+Base_Value, where "Clock_Value" is a clock signal, N is the number of channels in the hop sequence, and Base_Value is related to the first hop channel in the set of hop channels (i.e., 0 for the example sequence in FIG. 6 of that begins with G(0)).

For example, when the Clock_Value is 37, an index value if formed by (37 modulo 8+0) which is 5. A substitute hop channel is set as the table index value at Block 830. Whether the substitute hop channel is allowable is checked at Block 810 and, when allowable, is used at Block 840. Since G(5) is an allowable hop channel, it is used as a substitute channel to scan for a page message. When the substitute hop channel is forbidden, the operations of Blocks 820-840 are repeated to select another substitute hop channel.

In other embodiments, the substitute hop channel formed at Block 830 is passed directly to Block 840 for use without returning to Block 810 to check whether it is an allowable or forbidden channel. Those embodiments may be advantageous when a small number of interfering channels may exist relative to the length of the channel sequence and the likelihood of two consecutively selected forbidden substitute channels is sufficiently small.

In other embodiments, at Block 820, the index value to the substitute hop channel may be formed by a clock value, a random time-varying value, a pseudorandom time-varying value, and/or a non-random time-varying value relative to a designated channel in the sequence of hop channels. In other embodiments, a time-fixed (not changed during a connection establishment operation) mapping between a forbidden hop channel and a substitute hop channel may be provided. However, the randomness of the selection of channels by FH communication devices is often preferred and is sometimes even mandated by governmental regulations. The randomness with which substitute channels may be selected may be related to the relative number of different values used to select substitute channels compared to the number of channels N. For example, if the number of the clock signal values or time-varying values is less than N-1, then certain hop channels will be selected for use as substitute hop channels more frequently than others.

In other embodiments, when the pager device 300 transmits paging messages on a channel train (such as was described earlier), the scanner device 302 may restrict the selection of substitute hop channels to within the channel train. For example, the pager device 300 may scan a portion of the sequence of hop channels used by the scanner device 302 which are about equally distributed ahead-of and behind an estimated phase of the scanner device 302 (e.g., scanning within an A train, 16 of the 32 hop channels). The pager device 300 may transmit the page message on hop channels F(k_est−8), F(k_est−7), ..., F(k_est−1), F(k_est), F(k_est+1), ..., F(k_est+7) based on an estimated clock (k_est) of the scanning device 302. Since k_est changes every scan, so do the contents of the 16-carrier trains. The trains may overlap by one carrier: taking the two trains together, one carrier out of the 32-hop scanning sequence is not present, and one carrier is present twice. The overlap can be a consequence of the pager device 300 changing trains at the same pace as the scanner device 302 changing k_est.

To exploit the train behavior of the pager device 300, the scanner device 302 may restrict its selection of substitute hop channels (when a selected hop channel is determined to be forbidden) to channels in train A only. For example, when the modulo-32 clock value of the scanner device 302 is k_est, and if the selected channel G(k_est) is forbidden, the substitute channel should ideally be selected from within the allowed frequencies in the train adjacent to G(k_est), from G(k_est −8) to G(k_est+7) excluding all forbidden channels. However, the scanner device 302 does not know which estimate k_est the pager device 300 is using. Thus, k_est is not known by the scanner device 302, and is the pager device's 300 best guess of the current clock k_scan in the scanner device 302. The scanner device 302 should select a substitute channel from G(k_scan−8) to G(k_scan+7) excluding all forbidden channels. As k_est progresses with time, the content of train A changes.

As a further example, when the hop sequence consists of 8 channels, the two trains each consist of 4 channels. When the clock value (modulo-8) of the scanner device 302 is k_est, train A will be G(k_scan −2), G(k_scan −1), G(k_scan), G(k_scan +1), (where G(k_scan)=G(k_scan modulo 8)). Assume that channels G(2) and G(3) are forbidden. If k_scan=34, G(2), the selected channel is forbidden. The substitute channel is selected pseudo-randomly from one of the following channels: G(0), G(1), and G(3). Since G(3) is also forbidden, only G(0) and G(1) can be selected as a substitute channel. When no page message is received, another scanning channel is selected at the next scan instance, k_scan=35, so G(3) is initially chosen. The selected channel G(3) is determined to be forbidden. Because G(2) is also forbidden, the A train contains G(1) and G(4) as allowable channels that can be chosen as substitute channels.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method for establishing a connection by a scanner device to a paging device over a sequence of hop channels, the method comprising the steps of repeatedly activating the scanner device;

selecting by the scanner device a hop channel from the sequence of hop channels as a function of a present phase when the scanner device is activated;

determining by the scanner device whether the selected hop channel is a forbidden hop channel;

selecting by the scanner device a substitute hop channel from the sequence of hop channels as the selected hop channel if the selected hop channel is a forbidden hop channel, wherein the substitute hop channel is selected using a time-varying parameter;

monitoring by the scanner device the selected hop channel for receipt of a paging message from the paging device during the present phase;

establishing a connection from the scanner device to the paging device in response to receipt of the paging message; and wherein selecting a substitute hop channel comprises forming an index value from the time-varying parameter and selecting the substitute hop channel from the sequence of hop channels using the index value, wherein the index value is formed from the expression: index value=(the time-varying parameter modulo N)+BASE_VALUE, where N is the number of hop channels in the sequence of hop channels and BASE_VALUE represents an index value of a first hop channel in the sequence of hop channels.

2. A method for establishing a connection by a scanner device to a paging device over a sequence of hop channels, the method comprising the steps of
repeatedly activating the scanner device;
selecting by the scanner device a hop channel from the sequence of hop channels as a function of a present phase when the scanner device is activated;
determining by the scanner device whether the selected hop channel is a forbidden hop channel;
selecting by the scanner device a substitute hop channel from the sequence of hop channels as the selected hop channel if the selected hop channel is a forbidden hop channel, wherein the substitute hop channel is selected using a time-varying parameter, forming an index value from the time-varying parameter and selecting the substitute hop channel from the sequence of hop channels using the index value; and wherein selecting a substitute hop channel comprises:
designating one of the hop channels in the sequence of hop channels as a first hop channel; and
selecting by the scanner device a hop channel that corresponds to the index value relative to the first hop channel for use as the substitute hop channel;
monitoring by the scanner device the selected hop channel for receipt of a paging message from the paging device during the present phase; and
establishing by the scanner device a connection from the scanner device to the paging device in response to receipt of the paging message.

3. The method of claim 2, wherein the first hop channel is a designated one of the hop channels in the sequence of hop channels.

4. A method for establishing a connection by a scanner device to a paging device over a sequence of hop channels, the method comprising the steps of
repeatedly activating the scanner device;
selecting by the scanner device a hop channel from the sequence of hop channels as a function of a present phase when the scanner device is activated;
determining by the scanner device whether the selected hop channel is a forbidden hop channel;
selecting by the scanner device a substitute hop channel from the sequence of hop channels as the selected hop channel if the selected hop channel is a forbidden hop channel; wherein the selecting a hop channel from the sequence of hop channels comprises the steps of:
designating a portion of the sequence of hop channels adjacent to a forbidden hop channel; and
selecting a substitute hop channel from the designated portion of the sequence of hop channels:
monitoring by the scanner device the selected hop channel for receipt of a paging message from the paging device during the present phase; and
establishing by the scanner device a connection from the scanner device to the paging device in response to receipt of the paging message.

5. The method of claim 4, wherein the number of hop channels in the designated portion of the sequence of hop channels is the same for the scanner device and the paging device.

6. A communication device for use in a channel hopping communication system that includes a sequence of hop channels and a paging device, the communication device comprising:
a hop selection circuit within the communication device configured to repeatedly activate the communication device and to select a hop channel from the sequence of hop channels as a function of a present phase when the communication device is activated;
a hop substitution circuit within the communication device configured to determine whether the selected hop channel is a forbidden hop channel, to select a substitute hop channel from the sequence of hop channels as the selected hop channel if the selected hop channel is a forbidden hop channel, and to monitor the selected hop channel for receipt of a paging message during the present phase when the selected hop channel is a forbidden hop channel, wherein the hop substitution circuit is further operative to compare the closeness of a value represented by a received paging message and a value within the communication device, and to decide that the selected hop channel is a forbidden hop channel when the closeness of the comparison is outside a threshold range;
the hop substitution circuit further operative to:
monitor interference on the selected hop channel and to decide that the selected hop channel is a forbidden hop channel when the monitored interference exceeds a threshold value;
add the selected hop channel to a set of forbidden hop channels if the selected hop channel is determined to be a forbidden hop channel; and
add a channel that is adjacent to the selected hop channel, to the set of forbidden hop channels if the selected hop channel is determined to be a forbidden hop channel
a processor within the communication device configured to establish a connection from the communication device to the paging device in response to receipt of the paging message.

7. A communication device for use in a channel hopping communication system that includes a sequence of hop channels and a paging device, the communication device comprising:
a hop selection circuit within the communication device configured to repeatedly activate the communication device and to select a hop channel from the sequence of hop channels as a function of a present phase when the communication device is activated;
a hop substitution circuit within the communication device configured to determine whether the selected hop channel is a forbidden hop channel, to select a substitute hop channel from the sequence of hop channels as the selected hop channel if the selected hop channel is a forbidden hop channel, and to monitor the selected hop channel for receipt of a paging message during the present phase when the selected hop channel is a forbidden hop channel, wherein the hop substitution circuit is further operative to repetitively select a different substitute hop channel and to determine whether the selected substitute hop channel is forbidden until the selected substitute hop channel is determined to be not forbidden;
the hop substitution circuit further operative to:
monitor interference on the selected hop channel and to decide that the selected hop channel is a forbidden hop channel when the monitored interference exceeds a threshold value;
add the selected hop channel to a set of forbidden hop channels if the selected hop channel is determined to be a forbidden hop channel; and
add a channel that is adjacent to the selected hop channel, to the set of forbidden hop channels if the selected hop channel is determined to be a forbidden hop channel a processor within the communication device configured to establish a connection from the communication device to the paging device in response to receipt of the paging message.

8. A communication device for use in a channel hopping communication system that includes a sequence of hop channels and a paging device, the communication device comprising:
    a hop selection circuit within the communication device configured to repeatedly activate the communication device and to select a hop channel from the sequence of hop channels as a function of a present phase when the communication device is activated;
    a hop substitution circuit within the communication device configured to determine whether the selected hop channel is a forbidden hop channel, to select a substitute hop channel from the sequence of hop channels as the selected hop channel if the selected hop channel is a forbidden hop channel, and to monitor the selected hop channel for receipt of a paging message during the present phase when the selected hop channel is a forbidden hop channel, wherein the hop substitution circuit is further operative to compare the selected hop channel to a set of forbidden hop channels;
    the hop substitution circuit further operative to:
    monitor interference on the selected hop channel and to decide that the selected hop channel is a forbidden hop channel when the monitored interference exceeds a threshold value;
    add the selected hop channel to a set of forbidden hop channels if the selected hop channel is determined to be a forbidden hop channel; and
    add a channel that is adjacent to the selected hop channel, to the set of forbidden hop channels if the selected hop channel is determined to be a forbidden hop channel
    a processor within the communication device configured to establish a connection from the communication device to the paging device in response to receipt of the paging message.

9. The communication device of claim 8, wherein the hop substitution circuit is further operative to select a hop channel from the sequence of hop channels that is not within the set of forbidden hop channels.

10. The communication device of claim 8, wherein at least one of the set of forbidden hop channels is associated with received interference from a source other than the paging device.

11. The communication device of claim 8, wherein at least one of the set of forbidden hop channels is reserved for use by a communication system that is not the channel hopping communication system.

12. A communication device for use in a channel hopping communication system that includes a sequence of hop channels and a paging device, the communication device comprising:
    a hop selection circuit within the communication device configured to repeatedly activate the communication device and to select a hop channel from the sequence of hop channels as a function of a present phase when the communication device is activated;
    a hop substitution circuit within the communication device configured to determine whether the selected hop channel is a forbidden hop channel, to select a substitute hop channel from the sequence of hop channels as the selected hop channel if the selected hop channel is a forbidden hop channel, and to monitor the selected hop channel for receipt of a paging message from a paging device during the present phase when the selected hop channel is a forbidden hop channel, wherein the substitute hop channel is selected using a time-varying parameter and is further operative to form an index value from the time-varying parameter and to select the substitute hop channel from the sequence of hop channels using the index value, and wherein the hop substitution circuit is further operative to form an index value from the expression: index value=(the time-varying parameter modulo N)+BASE_VALUE, where N is the number of hop channels in the sequence of hop channels and BASE_VALUE represents an index value of a first hop channel in the sequence of hop channels; and
    a processor within the communication device configured to establish a connection from the communication device to the paging device in response to receipt of the paging message.

13. A communication device for use in a channel hopping communication system that includes a sequence of hop channels and a paging device, the communication device comprising:
    a hop selection circuit within the communication device configured to repeatedly activate the communication device and to select a hop channel from the sequence of hop channels as a function of a present phase when the communication device is activated;
    a hop substitution circuit within the communication device configured to determine whether the selected hop channel is a forbidden hop channel, to select a substitute hop channel from the sequence of hop channels as the selected hop channel if the selected hop channel is a forbidden hop channel, and to monitor the selected hop channel for receipt of a paging message from a paging device during the present phase when the selected hop channel is a forbidden hop channel;
    a processor within the communication device configured to establish a connection from the communication device to the paging device in response to receipt of the paging message;
    wherein the substitute hop channel is selected using a time-varying parameter;
    wherein the hop substitution circuit is further operative to form an index value from the time-varying parameter and to select the substitute hop channel from the sequence of hop channels using the index value; and
    wherein the hop substitution circuit within the communication device is further operative to designate one of the hop channels in the sequence of hop channels as a first hop channel and to select a hop channel that corresponds to the index value relative to the first hop channel for use as the substitute hop channel.

14. The communication device of claim 13 wherein the first hop channel is a designated one of the hop channels in the sequence of hop channels.

15. A communication device for use in a channel hopping communication system that includes a sequence of hop channels and a paging device, the communication device comprising:
    a hop selection circuit within the communication device configured to repeatedly activate the communication device and to select a hop channel from the sequence of hop channels as a function of a present phase when the communication device is activated;
    a hop substitution circuit within the communication device configured to determine whether the selected hop channel is a forbidden hop channel, to select a substitute hop channel from the sequence of hop channels as the selected hop channel if the selected hop channel is a forbidden hop channel, and to monitor the selected hop channel for receipt of a paging message during the present phase when the selected hop channel is a forbidden hop channel, wherein the substitute hop channel is selected by a time-fixed relationship between the forbidden hop channel and the substitute hop channel;

the hop substitution circuit further operative to:

monitor interference on the selected hop channel and to decide that the selected hop channel is a forbidden hop channel when the monitored interference exceeds a threshold value;

add the selected hop channel to a set of forbidden hop channels if the selected hop channel is determined to be a forbidden hop channel; and add a channel that is adjacent to the selected hop channel, to the set of forbidden hop channels if the selected hop channel is determined to be a forbidden hop channel a processor within the communication device configured to establish a connection from the communication device to the paging device in response to receipt of the paging message.

16. A communication device for use in a channel hopping communication system that includes a sequence of hop channels and a paging device, the communication device comprising:

a hop selection circuit within the communication device configured to repeatedly activate the communication device and to select a hop channel from the sequence of hop channels as a function of a present phase when the communication device is activated;

a hop substitution circuit within the communication device configured to determine whether the selected hop channel is a forbidden hop channel, to select a substitute hop channel from the sequence of hop channels as the selected hop channel if the selected hop channel is a forbidden hop channel, and to monitor the selected hop channel for receipt of a paging message during the present phase when the selected hop channel is a forbidden hop channel, wherein the hop substitution circuit is further operative to designate a portion of the sequence of hop channels adjacent to a forbidden hop channel, and to select a substitute hop channel from the designated portion of the sequence of hop channels; and a processor within the communication device configured to establish a connection from the communication device to the paging device in response to receipt of the paging message.

17. The communication device of claim 16, wherein the number of hop channels in the designated portion of the sequence of hop channels is the same for the communication device and the paging device.

18. A communication device for use in a channel hopping communication system that includes a sequence of hop channels and a paging device, the communication device comprising:

a hop selection circuit within the communication device configured to repeatedly activate the communication device and to select a hop channel from the sequence of hop channels as a function of a present phase when the communication device is activated;

a hop substitution circuit within the communication device configured to determine whether the selected hop channel is a forbidden hop channel, to select a substitute hop channel from the sequence of hop channels as the selected hop channel if the selected hop channel is a forbidden hop channel, and to monitor the selected hop channel for receipt of a paging message during the present phase when the selected hop channel is a forbidden hop channel, wherein the substitute hop channel is the hop channel preceding said forbidden hop channel in said sequence of hop channels;

the hop substitution circuit further operative to:

monitor interference on the selected hop channel and to decide that the selected hop channel is a forbidden hop channel when the monitored interference exceeds a threshold value;

add the selected hop channel to a set of forbidden hop channels if the selected hop channel is determined to be a forbidden hop channel; and add a channel that is adjacent to the selected hop channel, to the set of forbidden hop channels if the selected hop channel is determined to be a forbidden hop channel a processor within the communication device configured to establish a connection from the communication device to the paging device in response to receipt of the paging message.

19. A communication device for use in a channel hopping communication system that includes a sequence of hop channels and a paging device, the communication device comprising:

a hop selection circuit within the communication device configured to repeatedly activate the communication device and to select a hop channel from the sequence of hop channels as a function of a present phase when the communication device is activated;

a hop substitution circuit within the communication device configured to determine whether the selected hop channel is a forbidden hop channel, to select a substitute hop channel from the seguence of hop channels as the selected hop channel if the selected hop channel is a forbidden hop channel, and to monitor the selected hop channel for receipt of a paging message during the present phase when the selected hop channel is a forbidden hop channel, wherein the substitute hop channel is selected using a time varying parameter;

the hop substitution circuit further operative to:

monitor interference on the selected hop channel and to decide that the selected hop channel is a forbidden hop channel when the monitored interference exceeds a threshold value;

add the selected hop channel to a set of forbidden hop channels if the selected hop channel is determined to be a forbidden hop channel; and add a channel that is adjacent to the selected hop channel, to the set of forbidden hop channels if the selected hop channel is determined to be a forbidden hop channel a processor within the communication device configured to establish a connection from the communication device to the paging device in response to receipt of the paging message.

20. A communication device for use in a channel hopping communication system that includes a sequence of hop channels and a paging device, the communication device comprising:

a hop selection circuit within the communication device configured to repeatedly activate the communication device and to select a hop channel from the sequence of hop channels as a function of a present phase when the communication device is activated;

a hop substitution circuit within the communication device configured to determine whether the selected hop channel is a forbidden hop channel, to select a substitute hop channel from the sequence of hop channels as the selected hop channel if the selected hop channel is a forbidden hop channel, and to monitor the selected hop channel for receipt of a paging message during the present phase when the selected hop channel is a forbidden hop channel, wherein the hop substitution circuit is further operative to repetitively select a different substitute hop channel and to determine whether the selected substitute hop channel is forbidden until the selected hop channel is determined to be not forbidden;

the hop substitution circuit further operative to:

monitor interference on the selected hop channel and to decide that the selected hop channel is a forbidden hop channel when the monitored interference exceeds a threshold value;

add the selected hop channel to a set of forbidden hop channels if the selected hop channel is determined to be a forbidden hop channel; and add a channel that is adjacent to the selected hop channel, to the set of forbidden hop channels if the selected hop channel is determined to be a forbidden hop channel a processor within the communication device configured to establish a connection from the communication device to the paging device in response to receipt of the paging message.

* * * * *